United States Patent [19]

Hall et al.

[11] 3,845,657
[45] Nov. 5, 1974

[54] SURVEILLANCE SYSTEM INCLUDING MEANS FOR DETECTING IMPENDING FAILURE IN HIGH PRESSURE, HIGH TEMPERATURE FLUID CONDUCTING PIPES

[75] Inventors: William G. Hall; Paul F. Pittman, both of Pittsburgh, Pa.

[73] Assignee: Westinghouse Electric Corporation, Pittsburgh, Pa.

[22] Filed: Feb. 4, 1972

[21] Appl. No.: 223,562

[52] U.S. Cl. .............................. 73/88.5 R, 340/285
[51] Int. Cl. ........................................... G01b 7/18
[58] Field of Search ......... 73/398 AR, 88.5 R, 67.3; 340/285, 248 A

[56] References Cited
UNITED STATES PATENTS

| | | | |
|---|---|---|---|
| 2,530,184 | 11/1950 | Statham | 73/88.5 R |
| 3,197,697 | 7/1965 | McCauley | 73/88.5 R |
| 3,338,091 | 8/1967 | Tatum | 73/88.5 R |
| 3,341,816 | 9/1967 | Davis et al. | 340/248 A |
| 3,603,142 | 9/1971 | Saylak | 73/88.5 R |
| 3,646,815 | 3/1972 | Martin | 73/398 AR |
| 3,712,122 | 1/1973 | Harris et al. | 73/88.5 R |

*Primary Examiner*—Charles A. Ruehl
*Attorney, Agent, or Firm*—M. J. Moran

[57] ABSTRACT

A strain gage sensing system for detecting cracks in the welds of pipes. A portion of the system senses the propagation of the crack and another portion provides temperature compensation. The surveillance system monitors a plurality of strain gage channels and indicates either or both low level and high level strain due to cracking. The warning indication is provided by an illuminating means and audible alarm. The system includes facilities for calibration, digital voltmeter readout of selected channels and independent adjustment of both low and high warning levels for each channel.

8 Claims, 10 Drawing Figures

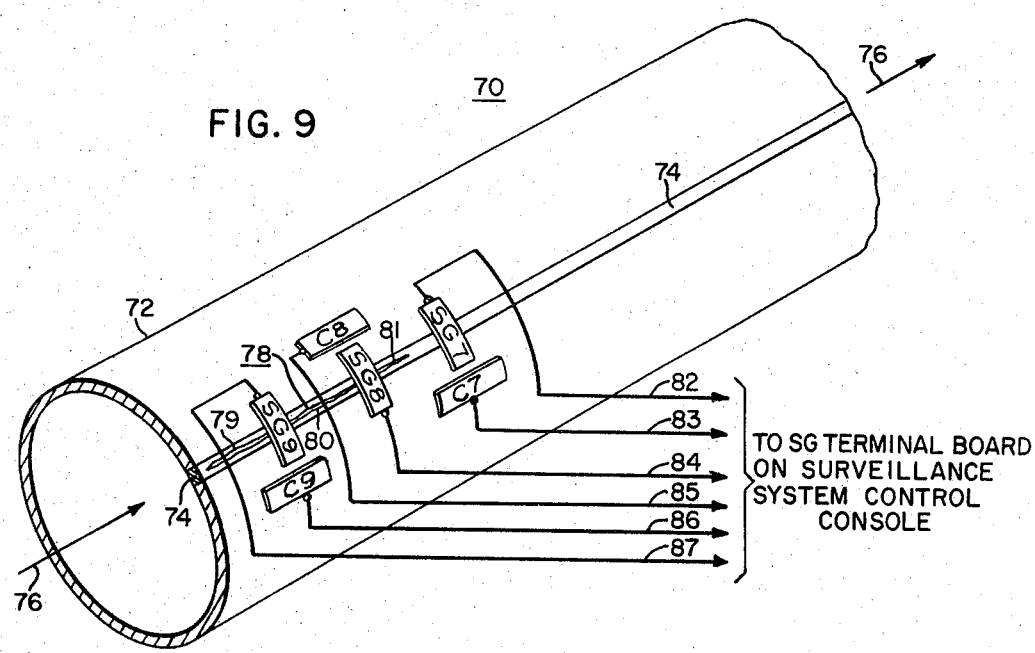
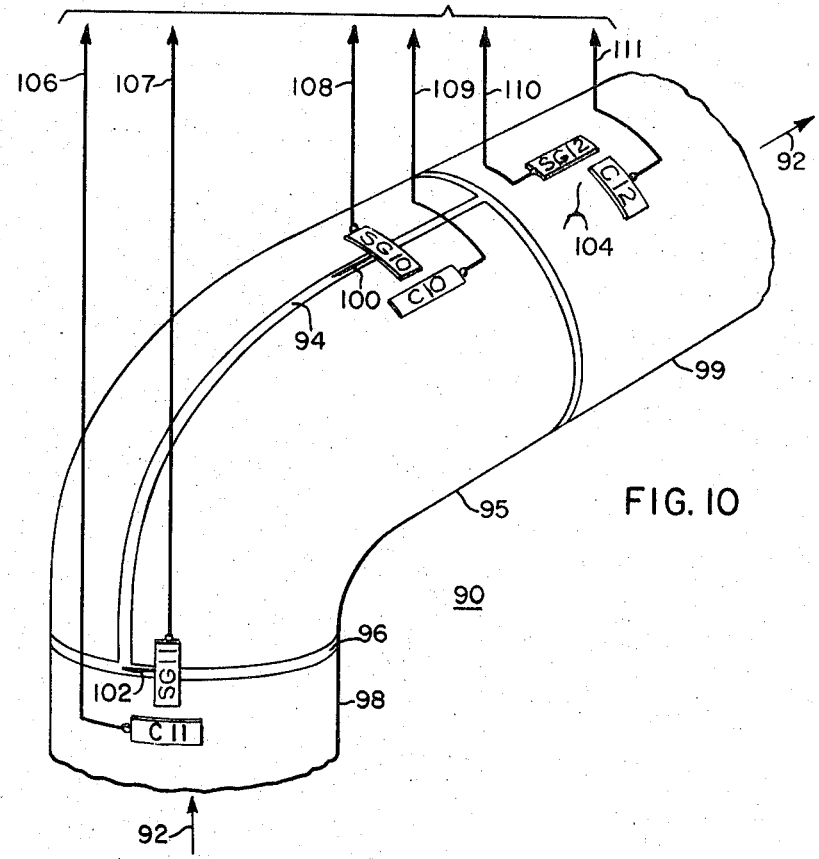

SURVEILLANCE SYSTEM INCLUDING MEANS FOR DETECTING IMPENDING FAILURE IN HIGH PRESSURE, HIGH TEMPERATURE FLUID CONDUCTING PIPES

BACKGROUND OF THE INVENTION

This invention relates generally to surveillance or monitoring systems and in particular it relates to a strain gage surveillance system for a steam turbine.

The energy source for an electrical generator may comprise a steam turbine having conduits or piping adapted to carry or conduct super heated, high pressure steam or water to and from various portions of the steam turbine. Portions of the pipes or conduits may comprise welded sections. It is known to provide an elbow of welded pipe in a run or length of pipe which may conduct high pressure steam from one portion of a turbine to another. The elbow may be an expansion elbow and is placed in the run or length of pipe to allow for variations in the physical size of the pipe due to expansion and contraction which may result from heat or pressure from flowing materials in the pipe such as super heated water or steam. The elbow is particularly adapted to flex and, therefore, compensate for the previously mentioned expansion and contraction. In some instances the pressure and temperature of the fluid or liquid being channeled through the pipe, including the expansion elbow, may be of such high energy content or be highly enthalpic that a specially alloyed material is needed to form the pipe or piping section. In the case of the previously mentioned elbow, such an alloy is often used. In forming the relatively flexible elbow section from the alloyed material, the pipe may be specially welded. This pipe may be known as longitudinally welded pipe. In the regions of high stress or strain, the weld may be susceptible to cracking, breaking or in some other manner being weakened. If this pipe section should fail catastrophically, the explosion or loss of pressure which may result could seriously damage the electrically generating system, and consequently, destroy or at a minimum cause an emergency shutdown of an electrically generating power plant. Such being the case, it would be advantageous to predict structural failure in a section of pipe, such as the elbow section previously mentioned, and take appropriate preventive measures either to adjust the energy content of the flowing fluid or temporarily immobilize the power plant under controlled conditions so that a replacement elbow or similar member may be placed into the system. This eliminates costly, unexpected, uncontrolled shutdowns which may lead to extensive damage as well as shutdowns which may immobilize the power plant for a long period of time.

SUMMARY OF THE INVENTION

In accordance with the invention, weldable strain gages are placed along a longitudinal weld in an elbow comprising a portion of a steam turbine. The elbow may be bent through 180°. These strain gages may be oriented perpendicularly to the expected direction of propagation of cracks in the weld. The strain gages may form one quarter of a section of a full wave strain gage bridge. Another strain gage which may form another one quarter section of the bridge may be oriented generally parallel to the direction of the weld or perpendicularly to the previously mentioned crack-sensing strain gage. The former strain gage may act as a temperature compensating strain gage, that is the temperature compensating strain gage may provide a resistance change in the bridge proportional to the ambient temperature change only. The output signal from the full strain gage bridge may be applied to an operational amplifier which may convert the voltage signal which results from a change in resistance of the elements in the strain gage bridge to a proportional signal suitable for electrically driving or providing a signal to a pair of voltage comparators or detectors. The voltage comparators are differential amplifiers having dual input terminals, one input terminal in each case being jointly connected to the output terminal of the previously mentioned signal conditioning operational amplifier. The other input terminal being connected in each case to the wiper or movable contactor of an adjustable potentiometer-voltage source combination so that the triggering level of each voltage comparator operational amplifier or the level at which it provides an output signal may be adjusted. In one instance a voltage comparator operational amplifier is so adjusted as to provide what will be referred to as a low level or low strain output signal, the other operational amplifier being adjusted to provide a high level or high strain output signal. The value of strain in each case may be predetermined for each strain gage. The respective output signals from each voltage comparator operational amplifier is provided to an indicating or warning means. In the case of the low level output operational amplifier, the signal is provided concurrently to a transistor and to the gage of a silicon controlled rectifier. The transistor is adapted to control the flow of electrical current to a lamp. The silicon controlled rectifier is similarly adapted to control the flow of current to another lamp. Upon being energized by the signal from the low level operational amplifier or voltage comparator, both lamps may illuminate to indicate that the low level operational amplifier has provided an output signal. In the case of the lamp controlled by the previously mentioned transistor, it will extinguish should the level of voltage provided by the low level operational amplifier decrease below the previously mentioned, adjusted, predetermined level. However, in the case of the silicon control rectifier, the lamp controlled by it, once turned on or energized, will not be extinguished except by a separate, reset means. Consequently, if ambient noise or similar conditions cause the low level operational amplifier to provide a temporary output signal which might otherwise indicate low level strain in the member or pipe or structural component being monitored, the absence of illumination in one low level warning lamp will indicate that the warning provided is not the result of permanent deformation in the structural member. The high level operational amplifier operates in a similar manner except that it provides an output signal solely to the gate of a silicon controlled rectifier which concurrently controls the energy provided to an indicating lamp and to an audio, audible alarm or annunciator. In the event that the high level operational amplifier is energized, the latter light or lamp will illuminate and the alarm will sound providing a warning that a crack or failure of relatively high magnitude is present and destruction in the monitored member is eminent. The audible alarm may be separately disconnected and all of the lamps in the system including both low level and the single high level warning lamps may be reset by independent means.

Generally, the low level warning lamps will first indicate the propagation of minute cracks or fissures into the region of at least one welded, sensing strain gage and provide a very early warning of eminent failure. The warning need not cause the turbine of the power plant to be shut down or taken off line at that time, but may provide an indication that closer scrutiny or inspection should be made of the welds in the vicinity of the crack or cracks. In another case, however, the crack may propagate rapidly causing the strain at the sensing strain gage to be relatively large thus energizing the high level warning system. This may be considered as a more drastic condition or a condition of an emergency nature which may require an immediate shutdown of the steam generating plant.

The previously mentioned signal conditioners, voltage comparators and warning means may be incorporated conveniently into a single console having a capability of monitoring a plurality of channels, such as 24 independent strain gage channels, simultaneously. Consequently, a system of strain gage warning means may be provided at a central console to indicate the propagation of cracks or flaws in a weld or other part of a steam carrying member of a turbine generating power plant. The console may have independent means for calibrating each strain sensing channel of the system as well as supplying energizing power from a central source and providing a digital volt meter readout. Various reset, power control and selector switches may be conveniently placed on control panel of the console.

BRIEF DESCRIPTION OF THE DRAWINGS

For better understanding of the invention reference may be had to the preferred embodiment exemplary of the invention shown in the accompanying drawings in which:

FIG. 9 shows another embodiment of the invention in which the sensing strain gages are disposed along a straight length of pipe; and FIG. 10 shows another embodiment of the invention in which the strain gages are shown disposed in various arrangements on a 90° elbow.

DESCRIPTION OF THE PREFERRED EMBODIMENTS

Figure 1:
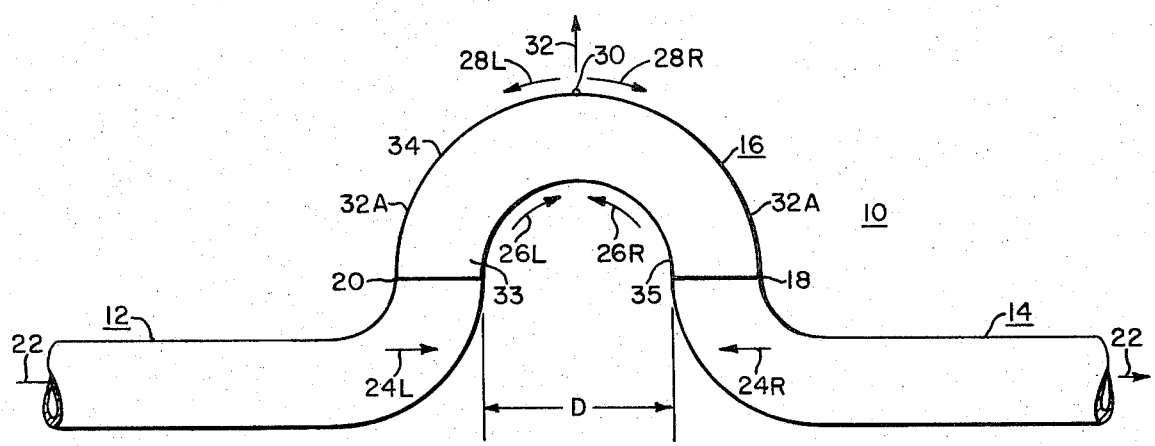
FIG. 1 shows a view of a 180° expansion elbow in a steam conducting pipe.

Referring now to the drawings and to FIG. 1 in particular, a pipe section 10 is shown. Pipe section 10 may comprise a left pipe portion 12, a right pipe portion 14 and a 180° elbow portion 16 that is a section of pipe bent through 180°. Pipe section 10 may comprise a portion of an axial flow, elastic fluid utilizing machine or steam turbine. Pipe section 10 may be adapted to conduct a flowing fluid such as super heated or heated steam which may be under high pressure or hot water or any other gaseous or liquid medium which may act to transfer energy from one portion of a steam turbine to another portion. Pipe section 10 may have the elbow or resilient member 16 joined to pipe sections or portions 12 and 14 also shown in FIG. 2 at joints 20 and 18, also shown in FIGS. 3 and 4 respectively. Joints 20 and 18 may be formed in any convenient manner such as by bolting adjacent flanged sections or welding abutted portions of pipe portion 14 and 12 to elbow portion 16. The generally semi-circular pipe portion 16 which may be known as an expansion elbow is included in pipe conducting section 10 to aid in preventing pipe section portions 12 and 14 from cracking, twisting or breaking due to thermal expansion or pressure in pipe section 10. Should a fluid, the direction of flow of which may be indicated by arrow 22 become sufficiently hot or have high enthalpy, pipe sections 12 and 14 may tend to expand longitudinally as indicated by arrows 24L and 24R. As this happens, expansion elbow 16 flexes or expands correspondingly to absorb the energy of the expansion of the pipe sections 12 and 14. This can be shown by noting the directions of arrows of force 26L and 26R which may be towards each other on the inner portion 33 of the arcuate shaped expansion member 16 and the correspondingly oppositely directed arrows 28L and 28R indicating directions of force on the outer portion 34 also shown in FIGS. 3 and 4 of expansion member 16. This operation may have the net effect of moving point 30 in a direction 32 which is generally away from a longitudinal axis along which the pipe portions 12 and 14 lie. Therefore, stresses or tension which may exist in pipe sections or members 12 and 14 may be transferred to expansion elbow 16. Expansion elbow 16 may have a weld on the outer portion 32 as indicated at 32A and/or a similar weld on the inner portion 33 as indicated at 35.

Figure 2:
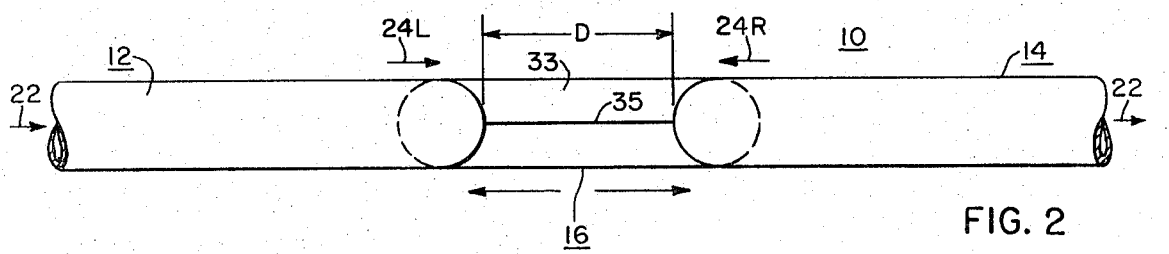
FIG. 2 shows another view of the expansion elbow and pipe shown in FIG. 1.

Referring now to FIG. 2, a view is shown of pipe section 10 rotated 90° from the orientation shown in FIG. 1. Forces as indicated by arrows 24L and 24R tend to make distance D also shown in FIG. 1 decrease or become smaller. This causes the expansion elbow 16 to react or respond as previously described. In another operating condition, for example, when fluid flow as indicated by arrows 22 comprises a cooler medium, the directions of force acting on pipe section 10 may be opposite to or different than those indicated by arrows 24R and 24L and consequently, distance D may increase or grow larger. Assuming, however, that distance D is forced to decrease by the expansion forces exerted on the elbow section 16, a stress may be placed on weld 35 on the inner portion 33 of elbow member 16.

Figure 3:
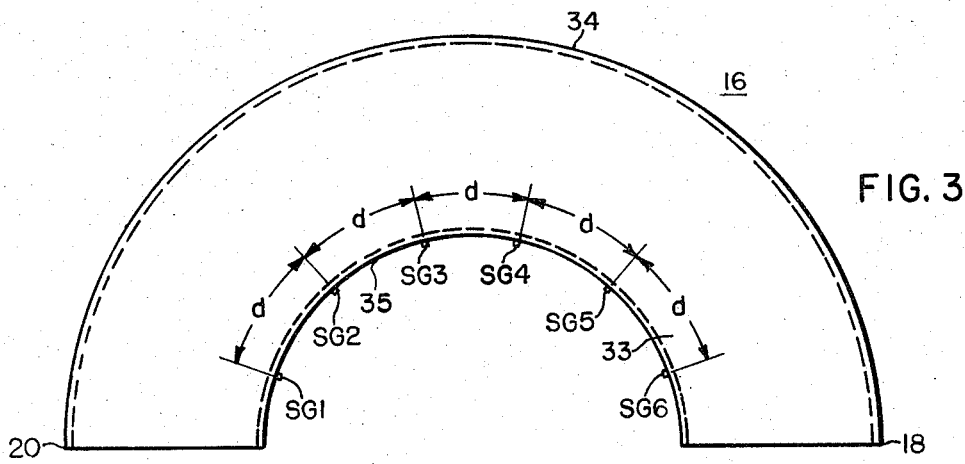
FIG. 3 shows a view of an expansion elbow only and one arrangement of strain gage sensors on it in accordance with the invention.

Referring now to FIG. 3, a top view of only an elbow section 16 similar to the view shown in FIG. 1 is shown. It will be noted that strain sensing members or strain gages SG1, SG2, SG3, SG4, SG5 and SG6 may be spaced generally in equal increments or steps d along the weld 35 on the inner perimeter or inner portion 33 of the elbow 16. Similar strain gages may also be placed along the outer weld 34 at convenient increments.

Figure 4:
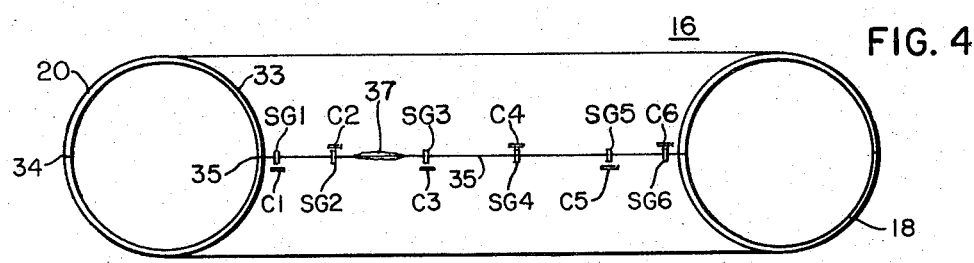
FIG. 4 shows another view of the expansion elbow shown in FIG. 3.

Referring now to FIG. 4, elbow section 16 is shown oriented similar to the manner in which elbow 16 is oriented in FIG. 2. Strain gages SG1, SG2, SG3, SG4, SG5 and SG6 are shown oriented or disposed perpendicularly to and along weld 35. In addition, temperature compensating strain sensing members or strain gages C1, C2, C3, C4, C5, and C6 may be placed or disposed perpendicularly with respect to the previously mentioned sensing strain gage members SG1, SG2, SG3, SG4, SG5 and SG6, respectively or generally parallel to the weld 35. The compensating members may be sensitive to changes in ambient temperature and provide a means for eliminating the effect of temperature variation during strain monitoring. A crack or fissure 37 which may develop in weld 35 may propagage longitudinally such as between strain gage SG2 and strain gage SG3. Such being the case, as the crack 37 penetrates or enters the region of the welded strain gage SG3 which may be spot welded to the inner portion 33 of expansion elbow 16, strain gage SG3 may react or respond by changing its resistance in proportion to the amount of strain induced by the propagating crack 37. Since the crack 37 will cause the material of the elbow member 16 to enlarge or move within the region of the welded strain gage SG3, strain gage SG3 will change size substantially proportionally and consequently change resistance substantially proportionally. Strain gage SG3 and its companion temperature compensating strain gage C3 may form one-half of a full strain gage bridge, the total change in resistance of which may be useful to provide an electrical signal indicating the presence of the crack 37.

Any of the strain gages such as SG1 through SG6 and C1 through C6 respectively may comprise integral half bridge strain gage sections or separate one quarter bridge strain gage sections which may be joined to form one-half bridge strain gage sections. One such type of integral half-bridge strain gage section may comprise nickel chromium wire filaments embedded in magnesium oxide filler and enclosed by a stainless steel cover and flange adapted to be welded to the area to be monitored or measured for strain. One set of nickel chromium (NI-CR) filament may be placed in a dummy mode, that is, may be formed into a temperature sensing spiral which may be oriented merely to sense changes in ambient temperature near the sensing or monitoring strain gage filament rather than changes in displacement along the face of the flange previously spoken of. Another type of half-bridge strain gage construction may comprise a platinum tungsten (Pp-W) element of filament which may comprise in combination an active or sensing filament and a filament for temperature compensation. In still another embodiment, a quarter bridge strain gage may be utilized, comprising a stainless steel protecting tube and flange as well as a compacted interposed magnesium oxide powder in which is embedded or contained a nickel chromium alloy strain filament with no dummy element or temperature compensating element being provided or present. Consequently, any full wave bridge in which this type of strain gage is to be employed may also have a separate temperature compensating strain gage.

Figure 5:
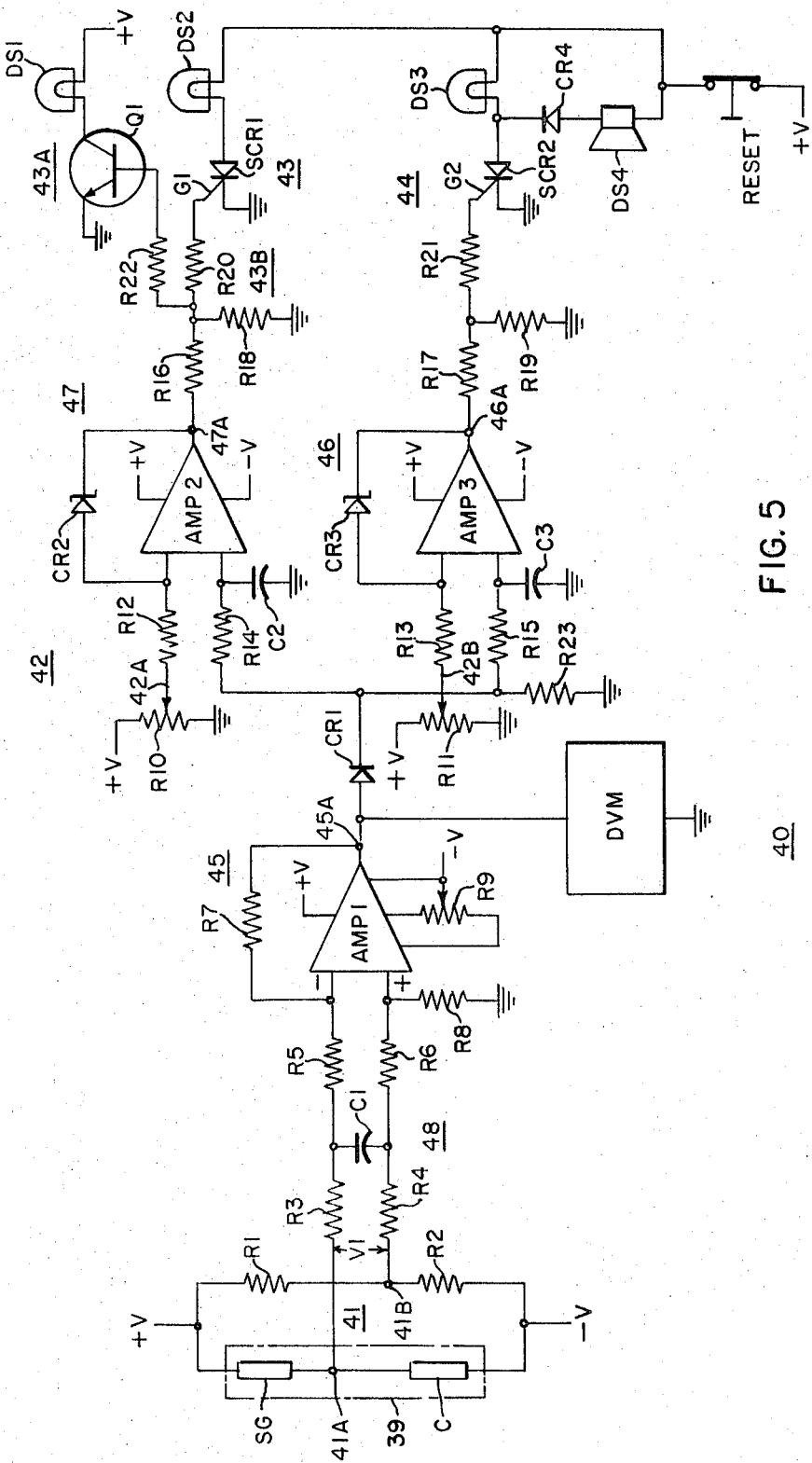
FIG. 5 shows a schematic circuit diagram of one channel of a strain gage sensing and surveillance system embodying the principal features of the invention.

Referring now to FIG. 5, a schematic circuit diagram in functional block form of a strain gage bridge surveillance system 40 is shown. This system may comprise a strain sensing means or electro-mechanical strain gage bridge network 41, a strain signal conditioning means 42, a low level warning means 43 and a high level warning means 44. The strain gage sensing means 41 may comprise an electro-mechanical strain gage transducer bridge network. The strain signal conditioning means 42 may comprise a signal conditioning electrical operational amplifier network 45 for providing a signal simultaneously to a high level voltage detector 46 and a low level voltage detector 47. Portions of the strain gage sensing means 41 may be affixed or secured to a member 39, such as welded pipe, which may be capable of changing dimension or size. The full wave strain gage bridge 41 may be energized by a voltage source comprising plus and minus voltages ($\pm V1$). The relative changes in resistance in strain sensing member SG may be applied to and filtered by filter means 48 and then applied to the input signal conditioning means or operational amplifier 45 from whence it may be supplied simultaneously to a high level voltage comparator 46 and a low level voltage comparator 47 which may also be known as the high level voltage detector and the low level voltage detector, respectively. The signal conditioning output signals from the high level and low level voltage detectors 46 and 47, respectively may be applied to warning means 44 and 43, respectively. Warning means 44 may include visual and audible warning indicators and warning means 47 may include a visual warning indicator. The warning systems or means 43 and 44 may include a memory means and may be reset independently by an adjacent electrically connected reset member.

Strain sensing means 41 may comprise a full wave bridge circuit having an active element or strain gage SG, and a compensating strain gage C, both of which may be placed in intimate proximity to or contact with a structural member 39. Balancing or bridge completing resistance means or resistors R1 and R2 may also be included in bridge circuit 41.

Bridge circuit 41 is arranged so that resistance means R1 is connected at one of its ends to one end of resistance means R2 and at its other end to one end of strain gage resistor SG. Resistance means R2 is, as previously mentioned, connected at one of its ends to resistance means R1 and at its other end to compensating strain gage means or resistor C. The other end of compensating strain gage C is connected to the other end of the active strain gage member SG. The junctions between active strain gage member SC and compensating strain gage member C is connected to one terminal of a filter network or circuit 48. The junction between resistors R1 and R2 is provided or connected to the other terminal of the same filter network 48. The positive voltage source +V1 is provided to the junction between resistance R1 and active strain gage SG and the negative voltage source −V1 is provided to the junction between resistance means R2 and the compensating strain gage means C.

Filter means 48 may comprise four resistance means or resistors R3, R4, R5 and R6 and a capacitor C1. Resistor R3 may be connected at one of its ends to the junction between strain gage SG and compensating strain gage C, and resistance R4 may be connected at one of its ends to the junction between resistor R1 and R2. One end of resistance or resistor R5 may be connected to the other end of the resistance or resistor R3 and one end of resistance or resistor R6 may be connected to the other end of resistance or resistor R4. Capacitor C1 may be connected or interposed between the junction between resistors R3 and R5 and resistors R5 and R6. The other end of resistor R5 and the other end of resistor R6 may comprise the output terminals for filter means 48 and may be connected respectively to the negative and positive input terminals of the differential operational amplifier AMP1.

The positive input terminal of differential operational amplifier AMP1 may be connected through resistor R8 to ground. The negative input terminal of the differential input operational amplifier AMP1 may be connected through a feedback resistor R7 to the output terminal 45A of the operational amplifier AMP1. The operational amplifier AMP1 may have voltages ±V applied thereto for power and may also have a variable resistor or potentiometer R9 with a wiper or movable tap connected to the negative voltage source V. This resistor or potentiometer R9 may be adjusted to compensate for electrical drift in amplifier AMP1. The output terminal 45A of amplifier AMP1 may be connected to a digital volmeter DVM, the other end of which is connected to ground or to a chassis common potential region. The output terminal 45A of amplifier AMP1 may also be connected to an isolating diode CR1 at the anode of isolating diode CR1.

The cathode terminal of isolating diode CR1 may be connected to resistors R14 and R15 which may be connected to the input terminals of the low and high level voltage detectors 47 and 46, respectively. One end of a resistor R14 is connected to the cathode of isolating diode CR1 and is connected at its other end to the positive input terminal of a low level voltage detector which includes differential operational amplifier AMP2. Also connected to the positive input terminal of amplifier AMP2 is one end of a capacitor C2 which is connected at its other end to ground or chassis common. The negative input terminal of differential operational amplifier AMP2 is connected to one end of a resistor R12. The other end of resistor R12 is connected to the movable member or wiper 42A of a potentiometer or variable resistor R10. One non-adjustable terminal of variable resistor R10 is connected to the positive voltage source +V and the other non-adjustable terminal of resistor R10 is connected to ground or chassis common. The wiper of resistor R10 is adjustable to change the voltage at the negative input terminal of the operational amplifier AMP2. Operational amplifier AMP2 may be energized by the voltages +V and −V. Also connected to the negative input terminal of differential operational amplifier AMP2 is a clamping Zener diode or regulator CR2 having its anode connected to the negative differential input terminal and its cathode connected to the outpt terminal 47A of the operational amplifier AMP2. Also connected to th output terminal of the operational amplifier AMP2 is the first portion or input terminal of the low level warning means 43, more specifically one end of resistor R16. The other end of resistor R16 is connected concurrently to one end of each of the resistors R18, R20 and R22. The other end of resistor R18 is connected to ground or chassis common. The other end of resistor R20 is connected to the gate G1 of a silicon control rectifier or thyristor SCR1, or the input terminal for that portion of warning means 43 known as the second low level warning section 43B. The other end of resistor R22 is connected to the base terminal of a solid state NPN transistor Q1 or the input terminal for that portion of warning means 43 known as the first low level warning section 43A. The emitter of transistor Q1 may be connected to ground or chassis common, and the collector of transistor Q1 may be connected through a first electrical lamp or illuminating means or first low level warning section illuminating means DS1 to the source of positive voltage +V. Transistor Q1 may be known as a first low level warning section valve. The cathode of the gated valve or second low level warning section gated valve may be connected to ground or chassis common, and the anode of the silicon control rectifier or thyristor SCR1 may be connected through a second electrical lamp or second low level warning section illuminating means DS2, which may be similar to lamp DS1, to a source of positive voltage +V through a reset switch or reset means indicated reset in the drawings.

One end of resistor R15 is connected to the cathode of the previously mentioned isolating diode CR1 in a manner similar to the way resistor R14 is connected to the cathode of isolating diode or undirectional valve CR1.

The other end of resistor R15 is connected concurrently to one end of the capacitor C3 and to the positive input terminal of a high level differential electrical operational amplifier AMP3. The other end of capacitor C3 is connected to ground or chassis common. The negative terminal or the other input terminal of the differential operational amplifier AMP3 is connected to one end of a resistor R13. The other end of resistor R13 is connected to the wiper or movable terminal or contact of a variable resistor or potentiometer R11. One non movable end of terminal of resistor R11 is connected to a source of positive voltage +V while the other non adjustable end of resistor R11 is connected to ground or chassis common. The wiper 42B of resistor R11 may be adjusted to provide a high level input voltage signal to the negative differential input terminal of amplifier AMP3. Also connected to the negative input terminal of the differential amplifier AMP3 is the anode of a regulator or Zener diode CR3. The cathode of the Zener diode CR3 is connected to the output terminal 46A of the differential amplifier AMP3. Operational amplifier AMP3 may be energized simultaneously with voltages +V and −V.

Also connected to the output terminal 46A of operational amplifier AMP3 is input terminal of the high level warning means 44. Resistor R17 is connected at one end to the output terminal 46A of the operational amplifier AMP3 and at its other end to two resistors, specifically resistors R19 and R21. The other end of resistor R19 is connected to ground or chassis common and the other end of resistor R21 is connected to the gate of a silicon controlled rectifier or thyristor or high level warning section gated valve SCR2. The cathode of silicon controlled rectifier SCR2 is connected to ground or chassis common. The anode of the silicon controlled rectifier SCR2 is connected concurrently to a lamp or indicating means or high level warning section illuminating means DS3, which may be similar to DS1 and DS2, and to the cathode of a unidirectional valve or diode CR4. The other end of third electrical lamp DS3 is connected to the positive voltage supply or source +V through the reset means indicated RESET in the drawings. The other end or anode of isolating diode or unidirectional valve CR4 is connected to an annunciator or high level audio warning means or system DS4. The other end of audio warning system DS4 is connected to the positive source of voltage +V through the previously mentioned reset means.

Also connected to the cathode of diode CR1 is a resistor R23 the other end of which is connected to ground or chassis common.

OPERATION OF THE SURVEILLANCE SYSTEM

Referring again to FIG. 5, the operation of the surveillance system 40 will now be considered. Under normal circumstances, i.e., when member 39 is not in a stressed condition, resistors R2 and R1 are in balance respectively with compensating strain gage C and sensing strain gage SG such that the output voltage or strain gage bridge output voltage signal V1 present between terminals 41A and 41B of the bridge network R1 is substantially equal to zero. The filter means 48 is provided to eliminate spurious noise signals from bridge 41 and irregularities in the power supply voltages +V and −V. Operational amplifier AMP1 may be adjusted by varying the movable contact on potentiometer R9 to provide a substantially zero output voltage at the output terminal 45A of the amplifier AMP1 when strain gage SC registers little or no strain. Should, however, strain gage member or means SG increase in resistance to indicate strain in or the enlargement of member 39, such as may be the case if a crack develops in member 39, an operational amplifier output voltage signal would be generated at the output terminal 45A because of unbalance in bridge circuit 41 and change in voltage V1. This voltage signal may be supplied simultaneously to the digital volt meter DVM and, through the isolating diode CR1 and various resistors such as resistors R14 and R15, to the input terminals of the operational amplifiers AMP2 and AMP3 respectively. The wiper or movable contact 42A of resistor R10 may be adjusted so that a predetermined value of voltage at output terminal 45A must be impressed upon the positive input terminal of amplifier AMP2 to generate an amplifier output voltage signal at terminal 47A of amplifier AMP2. Zener diode CR2 acts as a current sink or regulator until that predetermined amount of voltage is reached or exceeded. Assuming that potentiometer wiper 42A has been adjusted on potentiometer R10 to determine the predetermined value or amount of strain in member 39 which must introduce a voltage signal at output terminal 47A, this last-mentioned voltage signal will be provided to forward bias the base-to-emitter circuit of transistor Q1 to allow current to flow through the filament of indicating means or lamp DSL. This energization of lamp DS1 indicates that a predetermined relatively small amount of size change has occurred in member 39. The voltage signal present at terminal 47A is also provided to the gate G1 of the silicon controlled rectifier SCR1 to cause silicon controlled rectifier SCR1 to conduct from its anode to cathode thus providing current flow through the filament of lamp DS2 which illuminates. Should the voltage at terminal 47A be reduced or should spurious noise or vibration which may have caused terminal 47A to increase in voltage temporarily disappear or cease, the base-to-emitter circuit of transistor Q1 will be reverse biased and lamp DS1 will extinguish or be deenergized. However, lamp DS2, since it is controlled by a silicon controlled rectifier SCR1, will not be affected because gate terminal G1 is only effective to energize SCR1. Consequently, a predetermined low level of strain may be exceeded, in which case a permanent memory of such is indicated by the glowing or illumination of lamp DS2.

The voltage at the output terminal 45A of operational amplifier AMP1 also provided to the positive input terminal of differential amplifier AMP3. The wiper or movable portion of potentiometer R11 may be preset to provide a voltage at the negative differential input terminal of AMP3 to allow only a significant or relatively high value of dimensional change in member 39 to cause amplifier AMP3 to provide an output voltage signal at output terminal 46A. Such being the case, the gate G2 of silicon controlled rectifier SCR2 may be energized through the resistor combination which includes resistors R17, R19 and R21. This may cause the lamp DS3 to be energized or illuminate and the annunciator DS4 to provide an audio or audible indication of the presence of a relatively high amount of strain in strain gage SC which may be the result of a relatively large crack in member 39 or a relatively large change in the dimensional size of member 39. Since the silicon control rectifier or thyristor SCR2 is no longer controlled by gate G2 once energized, the diminishing in size of a crack in member 39 or the disappearance of noise which may have been generated in electrical circuitry preceding the gage G2 will not cause the illuminating means DS2 to extinguish nor allow the annunciating means DS4 to be deenergized. Consequently, an indication or memory of a high level of strain in member 39 is provided so that emergency measures may be taken if necessary. Opening or depressing the RESET means may remove the source of current from the previously mentioned elements DS1, DS2, DS3, DS4 and the control elements SCR1 and SCR2.

In summary, strain gage SC may be unbalanced by change in dimension or size in member 39 which may cause a voltage signal to be produced at the output terminal 45A of the signal conditioning operational amplifier or input operational amplifier AMP1. This change in voltage may be provided simultaneously to three adjacent means which include a digital voltmeter or indicator means; where an actual readout or portrayal of the degree of change in member 39 may be presented for viewing, a low level operational amplifier; which is preset to energize certain warning means when a low limit of strain has been reached or exceeded, and a high level operational amplifier; which is preset to energize other warning means when a relatively high predetermined level of strain has been reached or exceeded.

Figure 6:
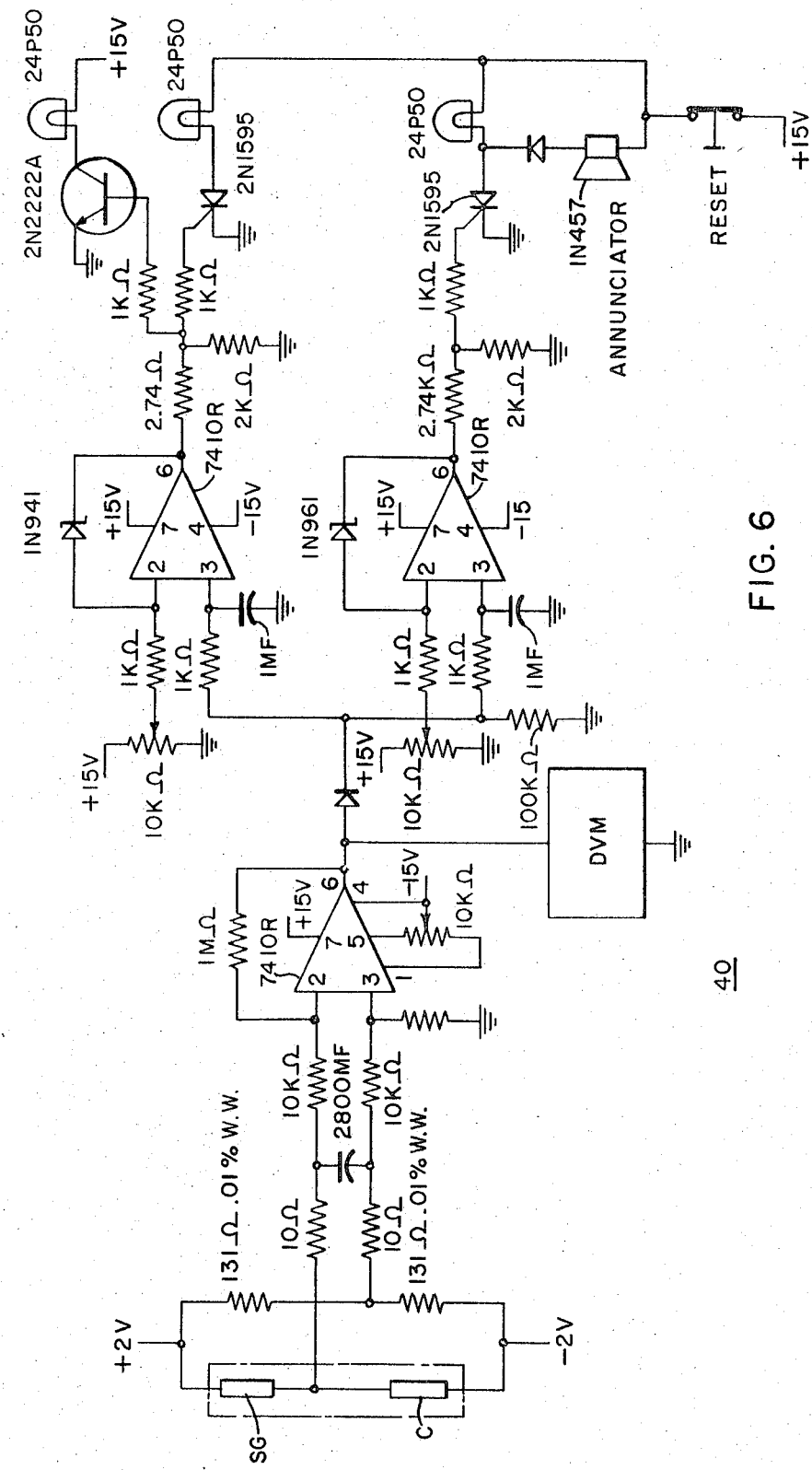
FIG. 6 shows a schematic circuit diagram similar to the one shown in FIG. 5 but which includes the parametric values or identifying symbols for the electrical elements of the circuit.

Referring now to FIG. 6, a schematic diagram, similar to the schematic diagram 40 shown in FIG. 5 is shown. The schematic diagram shown in FIG. 6 indicates the parametric values of circuit elements in a sensor surveillance system 40 embodying the invention and identifying numbers for the various lamps, annunciators, diodes, operational amplifiers and transistors.

Figure 7:
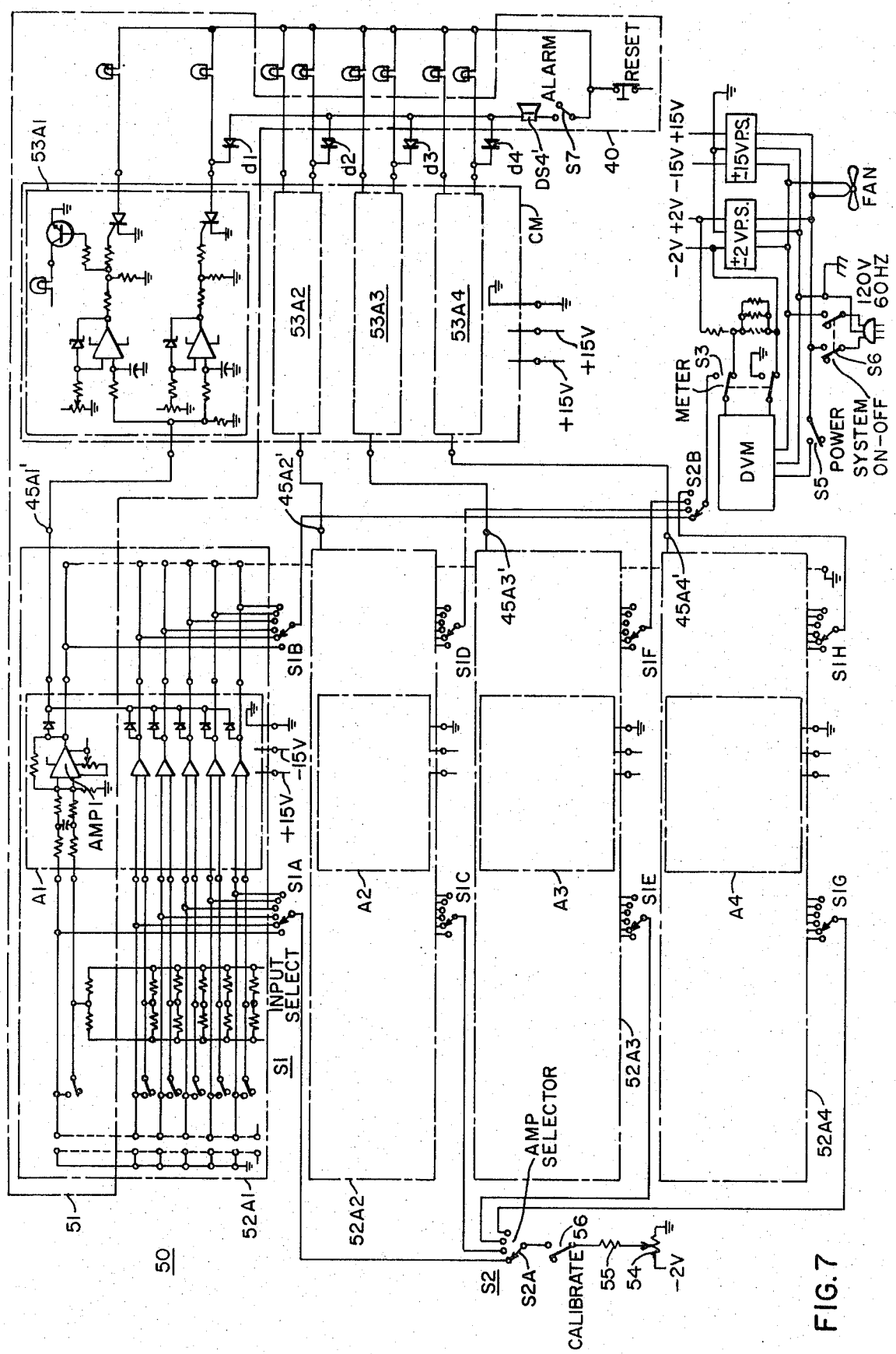
FIG. 7 shows a 24 channel surveillance system incorporating elements similar to those shown in FIGS. 5 and 6.

Referring now to FIG. 7 a complete surveillance system 50 suitable for monitoring a plurality of channels, such as 24 channels, of the type shown or depicted in FIGS. 5 and 6 and designated 40 is shown. A single surveillance channel 40 is shown within the dashed line 51. However, it will be noted that for purposes of convenience, the complete surveillance system 50 is arranged or oriented in a different manner to take advantage of commonly used components. For example, a single or common audio alarm or annunciator DS4' is employed for all 24 channels. The complete surveillance system 50 comprises four six-channel strain gage, partial signal conditioning blocks or electronic cards 52A1, 52A2, 52A3 and 52A4. Each of the four clusters or groups of partial signal conditioning networks comprises six sets of operational amplifiers, filters and bridge networks. For each card or cluster the output of all six operational amplifiers may be summed electrically at a central summing point such as 45A1' in block or cluster 52A1. There are three other summing junctions 45A2', 45A3' and 45A4' for modules 52A2 and 52A3 and 52A4, respectively. Each module or set of six input signal conditioning operational amplifiers and associated bridge networks may be connected through its summing output terminal such as 45A1', for example, to a single, combination low level-high level voltage detector warning system such as indicated by 53A1, 53A2, 53A3 and 53A4. Each of the voltage detector modules, such as 53A1, comprises elements similar to elements 43, 44, 46 and 47, shown in FIG. 5 of the single channel surveillance system 40, with the exception of a single alarm DS4' being used for all 24 channels. The single alarm DS4' may be connected to the output terminal of four silicon controlled rectifiers, which may correspond to SCR2 in FIG. 5, through four diodes d1, d2, d3 and d4.

In addition surveillance system 50 may include a calibration means 54, a calibration resistor 55, a calibration switch 56 which may be referred to as the CALIBRATE switch, a four position two deck calibration selector means or switch 52 which may be referred to as an AMP SELECTOR switch, with the first deck being identified as S2A and the second deck being identified as S2B. Also surveillance system 50 may include an indicator selector means or a six position 8 deck switch S1 which may be referred to as an INPUT SELECT switch with the decks being identified as S1A, S1B, S1C, S1D, S1E, S1F, S1G and S1H. The surveillance system 50 may also include a switch S3 for connecting the input terminals of the digital voltmeter DVM to one source of system power for calibration which may include a ± 2 volt power supply. The last mentioned switch may be identified as the METER switch. The source of system power may also include a separate ± 15 volt power source. The digital voltmeter or readout means DVM may be energized from a suitable source of power through a switch S5 which may be referred to as the POWER switch. The entire surveillance system 50 including the previously mentioned power supplies may be energized with 120V, 60 hertz alternating current, or a similar suitable energizing means through switch S6 which may be referred to as the SYSTEM ON-OF switch. Calibration means 54 may include a potentiometer having a first fixed terminal connected to chassis or system ground or common and a second fixed terminal connected to the −2V power source. The wiper or movable contact of calibration means 54 may be connected to calibration resistor 55 for providing a calibration voltage, which may be varied from zero to minus two volts, to all 24 channels of the surveillance system 50.

Calibration of any channel may be accomplished by adjusting potentiometer or calibration means 54 which as mentioned previously may be a three point variable resistor having a movable terminal and two fixed terminals such that one fixed terminal is grounded and the other fixed terminal is supplied to the minus 2 volt power supply and the movable terminal may be moved through the entire resistance range between zero and total resistance which may be 1,000 ohms so that any voltage or calibration signal between −2 volt and zero volts may be impressed upon the wiper connected to the resistor 55 which may have a value of 6180 ohms. By closing the CALIBRATE switch 56, the voltage present at the wiper of the potentiometer 54 is provided to the movable pole of switch S2 deck A or S2A. It may be, for example, then provided to the first position whereupon the voltage is then transmitted to the deck SA1 or switch S1 deck A from where it may be selectively channeled or provided to any of six terminals. Each of the six terminals being provided or connected to one of the six operational amplifiers corresponding to the amplifier AMP1 shown in FIG. 5. Channel 40 or any of the other channels may then be calibrated by moving or positioning switch S1 to the proper position, corresponding to the channel to be calibrated. Automatically, the ganged members or movable contacts of other portions or decks of the switch S1 (such as S1B) may be moved or positioned. For example, the wiper on deck S1B will be moved to the contact position corresponding to the output terminal of amplifier AMP1 which may be designated 45A1' and which may correspond to terminal 45A in FIG. 5. Consequently, the voltage at the output terminal 45A1' may be provided to one of the four terminals or contacts of the AMP SELECTOR switch S2 deck B or S2B. In this case it may be supplied to the first terminal thereof. This is because the AMP SELECTOR switch S1 which had been placed in the first position is ganged or moved in a manner so that the movable members or wipers in both deck A and deck B are simultaneously activated to the first position. This provides the output signal from the operational amplifier AMP1 to the digital voltmeter DVM, and to the input terminal of voltage detector warning system 53A1. This is useful in setting the high or low trip levels on the voltage comparators of a voltage detector warning system such as 52A1. The previously mentioned calibration procedure may be performed alternately and selectively for all four modules and also all 24 channels. Consequently, a structural member or welded section of pipe may be monitored in 24 different places to sense and indicate the presence of impending cracks which may cause a future catastrophic failure.

Surveillance means 50, in addition to having a common single alarm or annunciator which may be selectively removed from the circuit by ALARM SWITCH S7, also has an associated common or single RESET switch which may also reset any and all of the memory oriented lights or lamps as previously mentioned.

Figure 8:
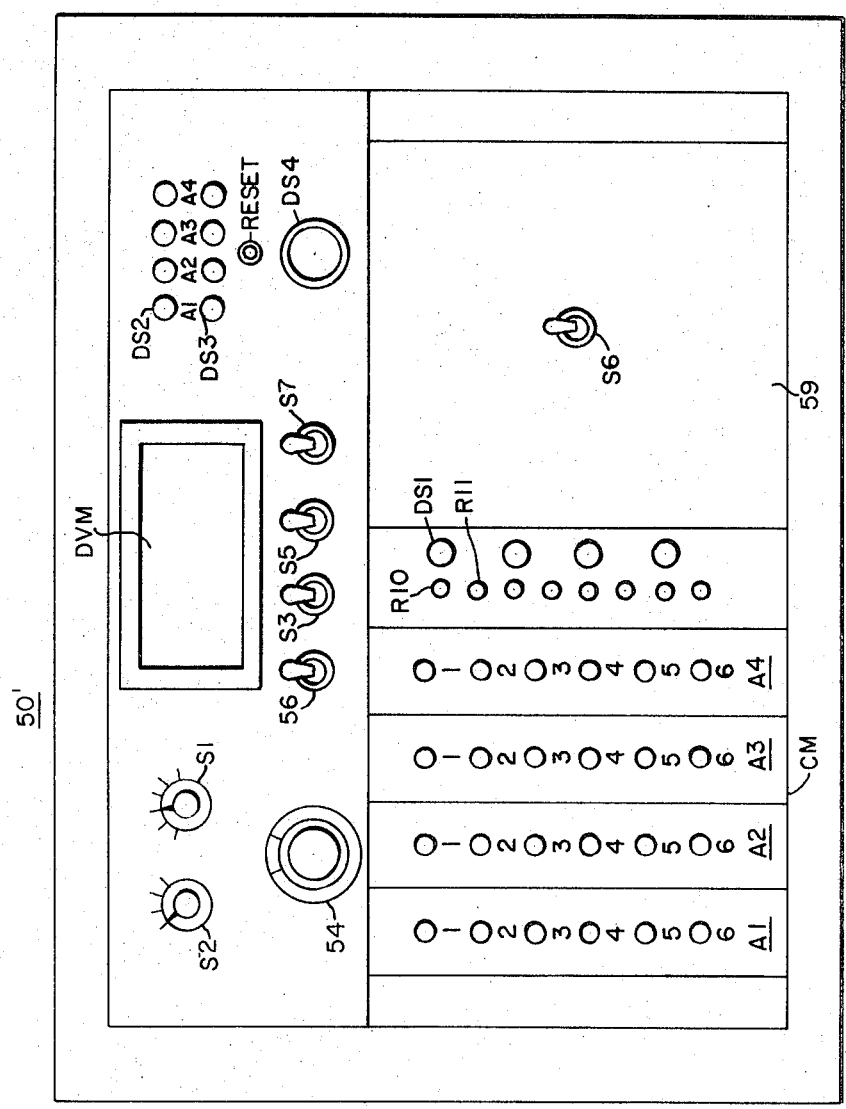
FIG. 8 shows the front panel of a console for the surveillance system shown schematically in FIG. 7.

Referring now to FIG. 8 a central console 50' or modular strain gage surveillance system cabinet is shown. The modules A1, A2, A3 and A4 are indicated, each having balance potentiometers numbered from 1 to 6 which may correspond to resistor R9 in FIG. 5. In addition the CALIBRATE switch indicated by 56 is shown as is the CALIBRATE potentiometer 54. The two deck AMP SELECT switch S2 having four positions is shown, as well as the six position, 8 deck INPUT SELECT switch S1. The CALIBRATE switch 56, the METER SWITCH S3 the POWER SWITCH S5, the ALARM disable switch or "alarm" switch S7 are shown oriented horizontally from left to right at the top of console 50'. The SYSTEM ON-OFF switch S6 is located on the power supply panel 59. Although the voltage comparators or low and high level detectors have been segregated as previously shown in FIG. 7 into four modular electronic circuits indicated by 53A1, 53A2, 53A3 and 53A4 the entire combination is placed in one module on console 50' known as the comparator module CM also shown in FIG. 7. This module is mounted adjacent to the four amplifier modules A1, A2, A3 and A4 and the power supply module 59. The comparator module CM comprises four sets of low and high level reference potentiometer screw adjustments indicated R10 and R11 respectively which drive or adjust potentiometers for the four modular elements 53A1, 53A2, 53A3 and 53A4. In addition, there are four sets of lights designated DS1 which respond to signals provided by submodules 53A1, 53A2, 53A3 and 53A4. The digital voltmeter DVM is show at the top center portion of the console 50'. The four low level warning alarm lamps indicated DS2 in FIG. 5 and the four high level warning alarm lamps indicated DS3 in FIG. 5 are numbered A1, A2, A3 and A4, respectively to correspond to amplifier modules A1, A2, A3, and A4, respectively and oriented in the upper right portion of the console 50'. A single reset button marked RESET is located in the upper right portion of console 50' and may be provided to manually reset the lamps A1, A2, A3 and A4 (corresponding to lamps DS2 and DS3) and the audible alarm, which is also shown in the upper right portion of the console 50'.

As an example of the operation of the strain gage surveillance system cabinet or console 50' the following may occur. The strain gage corresponding to the third strain gage in module A2, for example, may sense a developing crack in a member to be monitored such as 39 shown in FIG. 7 which may cause a low level strain in member 39. Lamp DS1 indicated at A1 on the comparator module CM will be energized and illuminate. This indicates that one of the six channels of the amplifier AMP1 in module A1 is indicating low level strain. By placing the AMP SELECT switch in position 1 (corresponding to the illuminated lamp A1) and jogging or incrementally moving the INPUT SELECT switch from position 1 through position 6, the exact channel may be pinpointed by noting the relative values of voltage indicated on the digital voltmeter DVM. When the digital voltmeter DVM shows a higher than normal value, the input selector switch will be positioned at that amplifier output terminal in module A1 which is indicating a high degree of low level strain.

The same procedure may be used when a high level strain is indicated such as by the illumination of lights DS2 or DS3 or the annunciation of the audible alarm. For example when the second strain gage provided to amplifier A2 is actuated or energized to a high level of strain the low and high level, lamps A2 and the audible alarm will illuminate and sound respectively. Since the lamps A2 are illuminated, the AMP SELECT switch should be switched to position 2 and the input selector should be jogged or incrementally moved from positions 1 to 6. It will be found that in one position (the second) a relatively high voltage level will be indicated on the digital voltmeter DVM indicating that the second strain gage in the second bank of strain gages is experiencing an excessive amount of strain and is therefore indicating an eminent failure in the vicinity of the weld being monitored.

Referring now to FIG. 9, another embodiment of the invention is shown. In this case, a relatively straight length or section of pipe 70 is shown having flowing through it a fluid which may be at high pressure and high temperature the flow of which is indicatd by the arrows 76. Pipe 72 may have a longitudinal weld 74 which contains a crack 78. It will be noted that three strain gages SG7, SG8 and SG9 are spot welded or placed upon pipe 72 perpendicularly to the longitudinal direction of welded seam 74. It will be also noted that compensating stain gages of the one-quarter bridge type C7, C8 and C9, respectively, are oriented parallel to the welded seam 74. Crack 78 has three regions indicating three degrees of fault; namely, region 79 constituting a greater fault, region 80 constituting a lesser or intermediate fault and region 81 constituting a minute fault. Strain gage SG7 if used as part of the previously described strain gage system 50 would for example probably not indicate any kind or fault or provide any warning. Strain gage SG8 if similarly used would probably energize conductor 84 to indicate a low level fault. Strain gage SG9 if used in a similar manner would probably energize conductor 87 to a relatively high level which may energize the audible alarm previously described to indicate a high level fault. Lines or conductors 82, 83, 84, 85, 86 and 87 which are connected respectively to strain gage SG7, compensating strain gage C7, strain gage SG8, compensating strain gage C8, and compensating strain gage C9 and strain gage SG9, respectively may be provided to th input terminals of surveillance system 50 as shown in FIG. 7 for actuation of the associated warning means.

Referring now to FIG. 10, still another embodiment of the invention is shown in which an arrangement of the strain gages is shown in association with a inety degree elbow or pipe section 98 and a similar pipe section 99 joined by the 90° elbow indicated by 95. The pipe system 90 includes a longitudinal weld or welded seam 94 which may be monitored by a perpendicularly disposed one-fourth strain gage bridge section SG10 and parallel disposed compensating strain gage C10, both of which may supply information through lines or conductors 108 and 109 respectively to a surveillance system such as 50 shown in FIG. 7. In addition, a radial welded seam connecting elbow 95 to longitudinal pipe section 98 may also be monitored, as indicated by the perpendicularly oriented strain gage SG11 and the corresponding parallel oriented compensating strain gage C11. Strain gage SG11 provides information through line or conductor 107 and temperature compensating strain gage C11 provides information through line or electrical conductor 106 to a surveillance system such as 50 shown in FIG. 7. Finally, longitudinal pipe or heat conducting pipe 99 may have a strain gage member SG12 and temperature compensating strain gage C12 mounted upon the pipe 99 merely to sense the presence of a crack 104 which may not exist in a weld at the time the strain gage SG12 is placed thereon. Strain gage SG12 may supply a signal or electrical information through an electrical conductor or line 110 and compensating strain gage C12 may supply electrical information through electrical line or set of conductors 111. The entire elbow, including the longitudinal sections of pipes 98 and 99 may conduct hot or high temperature water, steam or similar energy conducting gluid as indicated by arrows 92. Strain gage SG10 on elbow 95 may sense the presence of a crack 100 and strain gage SG11 mounted across the welded interface between elbow 95 and longitudinal pipe 98 may sense the eminent presence of crack 102.

It is to be understood that the surveillance system may be used to detect other than cracks in welds. It may be used to detect temperature variation in structural members rather than strain. It is also to be understood that integral half-bridge strain gage sections may be used, quarter bridge strain gage sections may be used, or even full bridge strain gage section may be used to monitor strain, temperature, etc. It is also to be understood that although a surveillance system 40 such as shown in FIG. 5 may use 15 volts DC and 2 volts DC power supplies, any suitable power supply arrangement providing DC power may be used where desired. It is also to be understood that although temperature compensating strain gages may be provided, they are not necessary for the detection of cracks in the welds of pipes of a steam turbine system, and the sensing strain gages themselves may be sufficient. And although two types of two constructions of strain gage have been mentioned, any type of strain gage may be used provided that it will develop a signal which may be used to energize certain described warning means. In addition, the channel and module arrangement of the overall surveillance system 50 need not be limited to a particular number of modules, such as four modules comprising six channels each, but may comprise any number of conveniently placed channels and need not be limited to 24. It is also to be understood that the operational amplifier, the silicon controlled rectifiers, the diodes, transistors and resistors may comprise all or part of integrated solid state circuitry. It is also to be understood that the surveillance system previously described need not be limited for use on a steam turbine, pipe system but may also be used in any system where a change in dimension in a member to be measured is to be employed to indicate or warn of an eminent failure. It is also to be understood that the readout indicator which has been called a digital voltmeter may be any form of readout means including an analog or D'Arsonval movement voltmeter or a computer readout or printout. It is also to be understood that some of the functions associated with the surveillance system may be automated and that the output terminals are adapted to be connected to a computer for on line analysis, control or signal feedback to various safety controls governing a system in which a crack or failure may occur.

The apparatus embodying the teachings of this invention has many advantages. Primarily among these is the detection of the presence of a crack or similar fault in a weld by a temperature compensated, strain gage, multichannel, surveillance system adapted to indicate the possibility of or potential for a structural failure prior to the actual failure of the member or pipe which is being monitored. Another advantage lies in the fact that the strain gages may be mounted upon the member to be surveyed, or examined to indicate the relative progression of a continuously increasing fault or crack in a weld or similar portion of a member. Still another advantage lies in the fact that the strain gage may be oriented to provide cross correlation of data so that strain indication in various members may be correlated with each other to aid in detecting a pattern of crack formation. This may be done using analytic statistical methods so that if one strain gage fails other strain gages may provide information which the failed strain gage would normally provide.

We claim as our invention:

1. A monitoring system for predicting structural failure in a member subject to stress by sensing strain, comprising sensing means for sensing strain disposed proximate to said member in a region of potential strain, said sensing means having an output terminal, said sensing means providing a voltage signal at said output terminal in relation to the amount of strain sensed in said member, a high level signal detector and a low level signal detector each comprising a differential operational amplifier, each said operational amplifier having an input terminal which is connected to said output terminal of said sensing means, each said high level signal detector and said low level signal detector not being interconnected, warning means, said warning means comprising a high level warning means and a low level warning means connected to the output of said high level operational amplifier and said low level operational amplifier respectively, said output voltage signal from said sensing means being provided to said high level operational amplifier and said low level operational amplifier substantially simultaneously, said low level operational amplifier actuating said low level warning means when said strain in said member is of a first predetermined value, said high level operational amplifier actuating said high level warning means when said strain in said member is of a second relatively larger predetermined value, said input terminal of said high level operational amplifier being maintainable at an adjustable voltage potential relative to a fixed voltage potential to generally fix said second relatively larger predetermined value of strain in said member at which said high level warning means is actuated, said input terminal of said low level operational amplifier being maintainable at an adjustable voltage potential relative to a fixed voltage potential to generally fix said first predetermined value of strain in said member at which said low level warning means is actuated, said low level warning means comprising first and second low level warning sections, said first low level warning section comprising a first low level warning section electrical valve and a first low level warning section illuminating means with power supply means, wherein said latter two means are interconnected electrically, wherein output electrical current from said low level operational amplifier actuates said last mentioned valve to cause said last mentioned illuminating means to visually indicate the presence of said first predetermined value of the strain in said member, said second low level warning section comprising a reset means, a second low level warning section electrical valve, and a second low level warning section illuminating means with power supply means, wherein said latter two means are interconnected electrically, wherein output electrical current from said low level operational amplifier actuates said last mentioned valve to cause said last mentioned illuminating means to visually indicate the presence of said first predetermined value of said strain in said member and to continue to indicate the presence of said first predetermined value of said strain in said member until reset by said reset means.

2. The combination as claimed in claim 1 wherein said high level warning means comprises a high level warning section reset means, a high level warning section electrical valve, a high level warning section illuminating means and a high level audio warning means with power supply means, wherein said latter three means are interconnected electrically, wherein output electrical current from said high level operational amplifier actuates said last mentioned electrical valve to cause said last mentioned illuminating means to visually indicate the presence of said second relatively larger predetermined value of said strain in said member, and also to cause said audio warning means to indicate the presence of said second relatively larger predetermined value of said strain in said member, said last mentioned illuminating means and the said audio warning means continuing to indicate until reset by said high level warning section reset means.

3. The combination as claimed in claim 2 wherein said first low level warning section electrical valve comprises a solid state transistor having base, collector and emitter terminals, said first low level warning section illuminating means comprises a first electrical lamp, said second low level warning section electrical valve comprises a first silicon controlled rectifier having anode, cathode and gate terminals, said second low level warning section illuminating means comprises a second electrical lamp, said high level warning section electrical valve comprises a second silicon controlled rectifier having anode, cathode and gate terminals, said high level warning section illuminating means comprises a third electrical lamp, a portion of said sensing means comprising a weldable sensing strain gate and a weldable temperature compensating strain gage wherein said sensing strain gage reacts to a change in the strain in said member due to an opening in a portion of said member to thereby provide said output electrical signal, said compensating strain gage reacting to the strain in said member due to temperature variation in said member.

4. The combination as claimed in claim 3 wherein said member comprises a metallic member having a region susceptible of opening to form a fissure, said sensing strain gage being oriented on said member generally perpendicular to the expected direction of propagation of said fissure, said temperature compensating strain gage being oriented on said member generally parallel to the expected direction of propagation of said fissure.

5. The combination as claimed in claim 4 wherein said metallic member comprises a section of pipe for conducting heated, pressurized fluid.

6. The combination as claimed in claim 5 wherein said pipe comprises a longitudinally welded section of pipe, formed in the shape of an elbow wherein said fluid generally comprises water.

7. The combination as claimed in claim 5 wherein said pipe comprises a longitudinally welded section of pipe formed in the shape of an elbow wherein said fluid generally comprises elastic fluid.

8. The combination as claimed in claim 7 wherein said elastic fluid generally comprises steam and said elbow comprises a generally one hundred and eighty angular degree semicircular section.

* * * * *